(12) United States Patent
Christoph

(10) Patent No.: US 6,948,825 B2
(45) Date of Patent: Sep. 27, 2005

(54) ILLUMINATION DEVICE AND METHOD FOR ILLUMINATING AN OBJECT

(75) Inventor: Ralf Christoph, Schoeffengrund (DE)

(73) Assignee: Werth Messtechnik GmbH, Giessen (DE)

( * ) Notice: Subject to any disclaimer, the term of this patent is extended or adjusted under 35 U.S.C. 154(b) by 25 days.

(21) Appl. No.: 10/469,232

(22) PCT Filed: Apr. 2, 2002

(86) PCT No.: PCT/EP02/03633

§ 371 (c)(1),
(2), (4) Date: Sep. 17, 2003

(87) PCT Pub. No.: WO02/082011

PCT Pub. Date: Oct. 17, 2002

(65) Prior Publication Data

US 2004/0136190 A1 Jul. 15, 2004

(30) Foreign Application Priority Data

Apr. 3, 2001 (DE) .......................... 101 16 588
May 30, 2001 (DE) .......................... 101 26 507

(51) Int. Cl.$^7$ ............................................... F21V 13/00
(52) U.S. Cl. .......................... 362/33; 362/231; 362/250
(58) Field of Search ................................. 362/231, 234, 362/241, 250, 33, 11, 252; 356/394; 348/135

(56) References Cited

U.S. PATENT DOCUMENTS

| 4,893,223 | A | * | 1/1990 | Arnold ........................ 362/252 |
| 5,039,868 | A | | 8/1991 | Kobayashi et al. .... 250/559.08 |
| 5,369,492 | A | | 11/1994 | Sugawara .................... 356/394 |
| 6,179,439 | B1 | * | 1/2001 | Choate ........................ 362/247 |

FOREIGN PATENT DOCUMENTS

| DE | 3906555 | 8/1991 |
| DE | 4016264 | 11/1991 |
| DE | 19653234 | 11/1997 |
| DE | 19837797 | 4/1999 |
| GB | 2126745 | 3/1984 |
| WO | 99/53268 | 10/1999 |

* cited by examiner

Primary Examiner—Ali Alavi
(74) Attorney, Agent, or Firm—Dennison, Schultz, Dougherty & MacDonald

(57) ABSTRACT

An illumination arrangement for illuminating an object to be measured, destined in particular for a coordinate measuring system or a measuring microscope, includes several light sources (18, 20, 22, 24, 26, 28, 30, 32, 34, 36, 60, 62, 64, 66, 68) going out from a support (16, 70) having different incidence angles with respect to an optical axis (14) of an optic, by means of which the object can be measured or imaged. The light sources in the support are arranged in such a way, that their incidence angles ($\alpha$, $\beta$, $\gamma$, $\delta$, $\kappa$) intersect the optical axis (14) in divergent areas (48, 50, 52, 54, 56).

23 Claims, 4 Drawing Sheets

Figur 1

ILLUMINATION DEVICE AND METHOD FOR ILLUMINATING AN OBJECT

Figure 1:
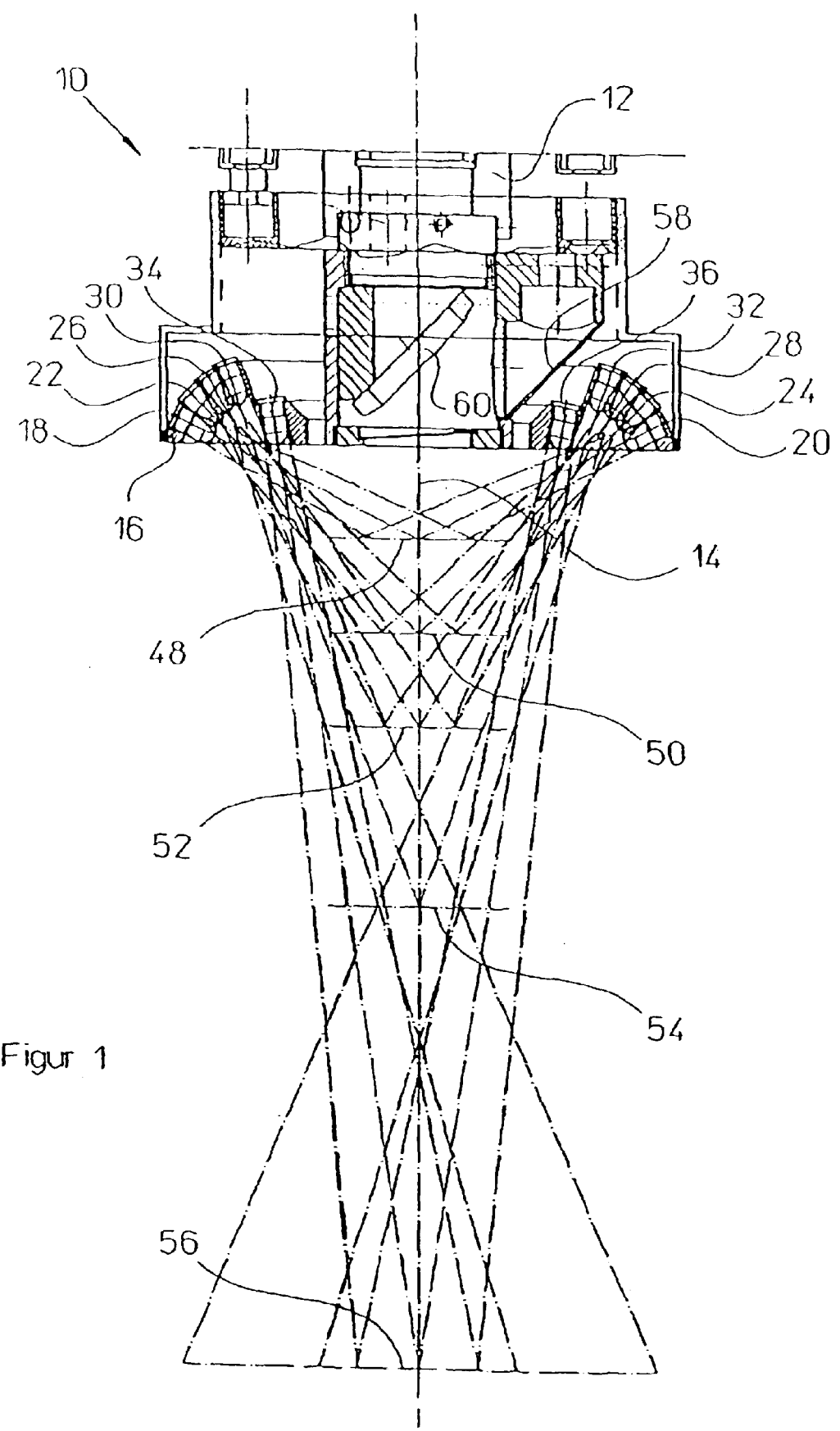

The invention concerns an illumination arrangement for illuminating an object to be measured, destined in particular for a coordinate measuring device or a measuring microscope, comprising several light sources extending from a support and having different incidence angles with respect to an optical axis of an optic with which the object can be measured or imaged. The invention also concerns a process for illuminating an object having several light sources with divergent incidence angles with respect to an optical axis of an optic, with which the object is measured or imaged.

When using optical and multisensor coordinate measuring devices as well as measuring microscopes, it is necessary to illuminate the objects to be measured by means of suitable illumination arrangements. In these, the usual types of illumination are transmitted light, bright field incident light and dark field incident light. By selecting between the different illumination possibilities in dependence upon the shape of the object to be measured is ensured an optimal illumination. Thus, in dark field illumination, only the light that is diffracted in the object contributes to the imaging, whereby individual structures appear bright on a dark background. In bright field illumination, the light to be emitted reaches directly into the object as transmitted light or incident light. The objects appear thus, insofar as they are themselves rich in contrast, dark or colored on a bright background.

Of particular importance is the configuration of the dark field incident illumination. Herein are used systems in the form of, for example, glass fiber ring lights or ring-shaped arrangements of LEDs (light-transmitting diodes). To be able to displace the illumination angle within an unchanged working plane, the glass fiber ring lights are divided into several segments or, to achieve the same results, the LED areas can be connected and disconnected segment by segment. Because of this, there exists the possibility of exposing the object to be measured to different lighting or to change the direction of incidence of the lighting.

Also known are proposals in which the angle between the surface of the object to be measured and the illumination incidence beam can be configured differently by means of a simultaneous lifting and lowering of an illumination source or spherical arrangement of several illumination sources. It is disadvantageous of these measures that collision problems with the object to be measured can occur due to the necessary mechanical displacement of the illumination system. A relatively complicated mechanism becomes necessary or the entire working distance is unfavorably reduced.

From DE 39 06 555 A1 an incident light object illumination device with selectable light incidence angle and several individually switchable light sources is known. At the same time, an illumination at different selectable illumination angles is possible without a mechanical displacement of the light sources or imaging elements, and at the same time, an illumination at different selectable illumination angles. For this purpose, the light sources going out from a calotte-shaped support, which can be arranged concentrically around a tube of a microscope, can all be aligned with respect to an object plane, so that the imaging distance is to be selected always equal. An arrangement for this purpose is also conceivable for coordinate measuring apparatuses.

In a programmable surface illuminator for video testing devices according to DE 199 04 899 A1, LEDs aligned parallel to each other go out from a disk-shaped support whose beams fall on a parabolic mirror, by means of which the radiation can fall on the object to be measured at incidence angles within a range between 45° and 90°.

It is also known to arrange a Fresnel lens between light sources such as light-emitting diodes and an object to be measured so as to illuminate an object to be measured at different incidence angles (DE 198 37 797 A1).

Other arrangements for illuminating an object at divergent incidence angles focused on a mutual working plane are disclosed in U.S. Pat. No. 4,893,223 or DE 196 53 234 A1.

From DE 40 16 264 C2 is known a fiberoptic multi-point lamp with a cylinder-shaped head for illuminating the working field of a microscope.

To adjust the illumination of a fiberoptic multi-point lamp to a desired object field, light conducting fiber bundles are configured so as to be movable according to DE 32 00 938 A1.

It is an object of the invention to further develop an illumination arrangement as well as a process for illuminating an object in such a way that a problem-free adjustment of the illumination is possible within different working planes so as to optimally illuminate an object to be measured or a surface or edge of the object. A limitation of the measuring range should at the same time not take place due to the light sources themselves.

The object is attained according to the invention essentially by means of an illumination arrangement of the kind described above by arranging the light sources in such a way within a support that their incidence angles intersect the optical axis within areas, which are spaced with respect to each other, in particular within divergent working distances of the optic. It is provided especially that the light sources on the optical axis are preferably arranged on concentrically surrounding circles, while the light sources arranged on circles of different diameters can intersect the optical axis in areas having divergent working distances.

The support for the light sources can span a plane that vertically intersects the optical axis. The support can therein form a circular disk or can also consist of only one or several cubic or beam-shaped holders for the light sources.

There is also the possibility of configuring the support in the shape of a hood or calotte that in turn surrounds concentrically the optical axis.

To make possible a high density of the light sources to be mounted, the invention provides that the light sources such as LEDs are arranged radially offset with respect to each other on successive circles.

The support having the desired geometry should have recesses such as bores, in which the light sources can be preferably fixedly arranged. However, there is also the possibility of displacing as well as pivoting the light sources themselves in the individual recesses.

It is especially provided that the support is in itself vertically adjustable, that is, it is configured so as to be displaceable along the optical axis. Such an arrangement is suitable in particular for a measuring arrangement with an optic, which has a constant or essentially constant working distance.

In a support with a calotte or hood-shaped geometry, the same should have at its object side an area for accommodating the light sources with a radius of curvature of 40 mm$\leq$R$\leq$80 mm, in particular R of about 60 mm. Through this, the light sources can be arranged in such a way in particular on circles running concentrically with respect to each other, that the beams intersect the working plane at an angle of 5° to up to, for example, 85°, without the support having to have a height that causes the danger of a collision with the object to be measured. At the same time, it is not required that the support be displaced with respect to the optic or the housing wherein it is accommodated.

An angular adjustment between the illumination beam and the surface of the object can take place according to the invention by means of different angular positions of fixedly arranged light sources, wherein these are arranged within a plane that is located in a collision-free space. In dependence upon the effective working distance or area to be illuminated are used those light sources whose angular positions are aligned with respect to the working distance or operating range. Vice versa, the angular displacement is achieved by changing the effective working distance of the used optic or the optical system. Of course, there is also the possibility of utilizing always all or essentially all of the light sources to illuminate the object, wherein always an optimal illumination of the object takes place on the working plane, since in accordance with the invention groups of light sources intersect the optical axis of the optic in different areas or sections. Consequently, in this case, the work can be carried out without additional mechanical displacement at different illumination incidence angles as well as also sufficiently long working distances.

If the illumination arrangement of the invention is destined in particular for dark field incident light processes, then it is possible to use the arrangement also for bright field incidence measurements without problems. For this purpose, it is provided that the radiation emitted by the light sources is deflected in such a way that these meet along the optical axis on the object. Of course, the imaging optic can also be provided in the usual way for a bright field incident light arrangement.

If, as mentioned, the light sources are preferably LEDs, then also fiber bundles and/or fiber ring segments can be used to realize the teaching of the invention. As light sources are also suitable, however, mirrors by means of which the light can be deflected in such a way that the incidence angles of the radiations reflected by the mirrors intersect the optical axis of the optic in divergent areas, in particular working distances.

In a further development, it is provided that the optic comprises several cameras provided at different distances between the lens vertex and the back focus, to which is assigned a mutual objective with fixed focal distance. The optic can also comprise several objective-camera systems, which have divergent working distances with respect to the object.

Independently thereof, the optic can be configured as zoom optic with a variable working distance, that is, it can have a design as seen in WO 99/53268, to whose disclosure is made reference expressly herein.

The light sources can also illuminate the object with divergent colors, wherein, if required, light sources with an identical incidence angle illuminate the object with the same color.

A process for illuminating an object with several light sources having divergent incidence angles with respect to an optical axis of an optics mechanism, with which the object is measured or imaged, is characterized in that the incidence angle of the light sources is aligned in such a way with respect to the optical axis that different light sources intersect the optical axis in areas, which are spaced with respect to each other. At the same time, the object can be illuminated with the light sources whose incident angles are aligned in dependence upon the working distance. There is also the possibility of adjusting the working distance of the optic in dependence upon the incidence angle of one of the light sources that illuminate an area of the object to be measured.

Finally, a support that accommodates the light sources can be displaced along the optical axis with a fixed working distance of the optic so as to illuminates the object with desired incidence angle.

Further details, advantages, and features of the invention do not result only from the claims, the features disclosed therein, per se and/or in combination, but also from the following description of the preferred exemplary designs seen in the drawings.

Figure 2:
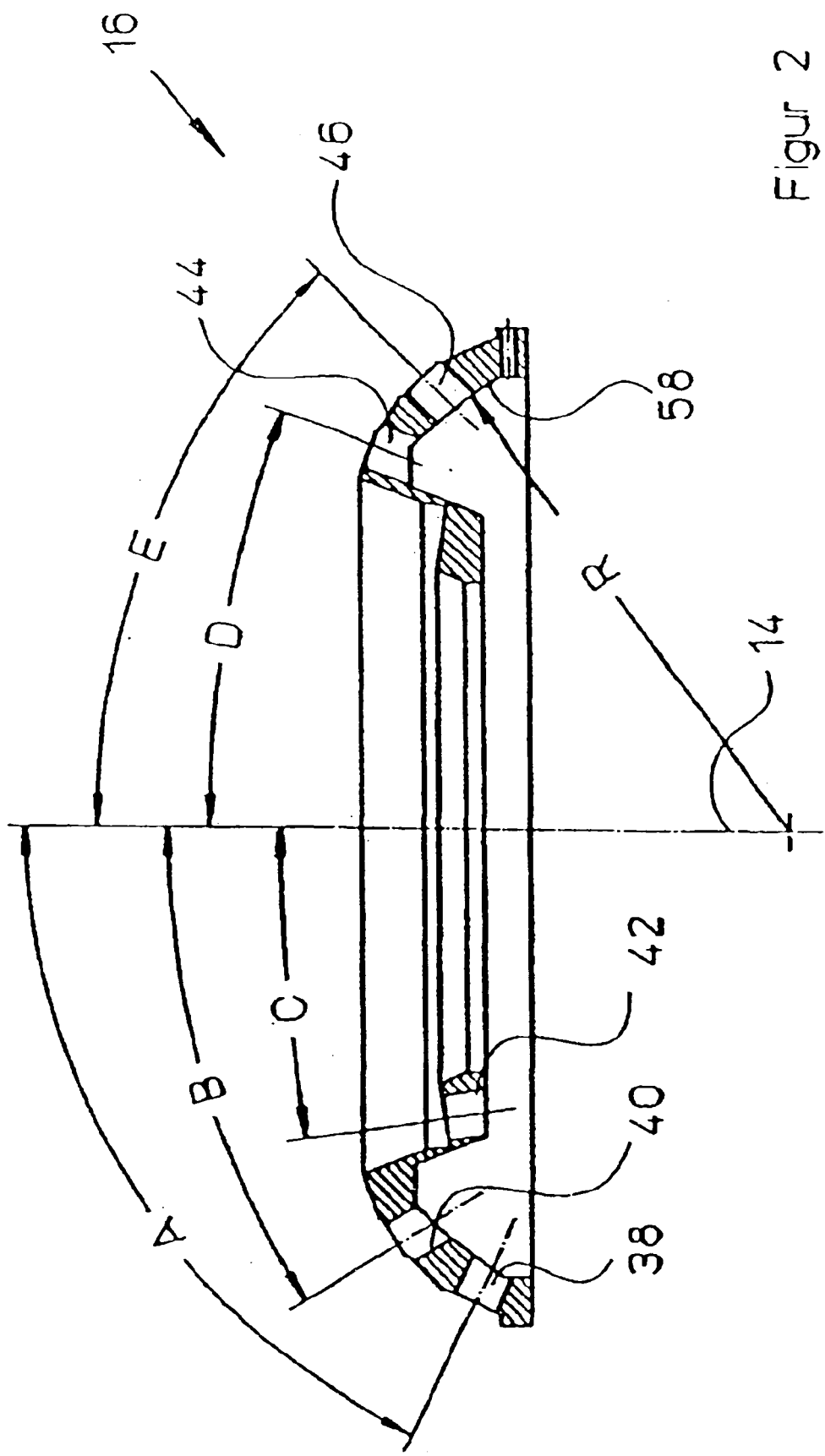
Figure 3:
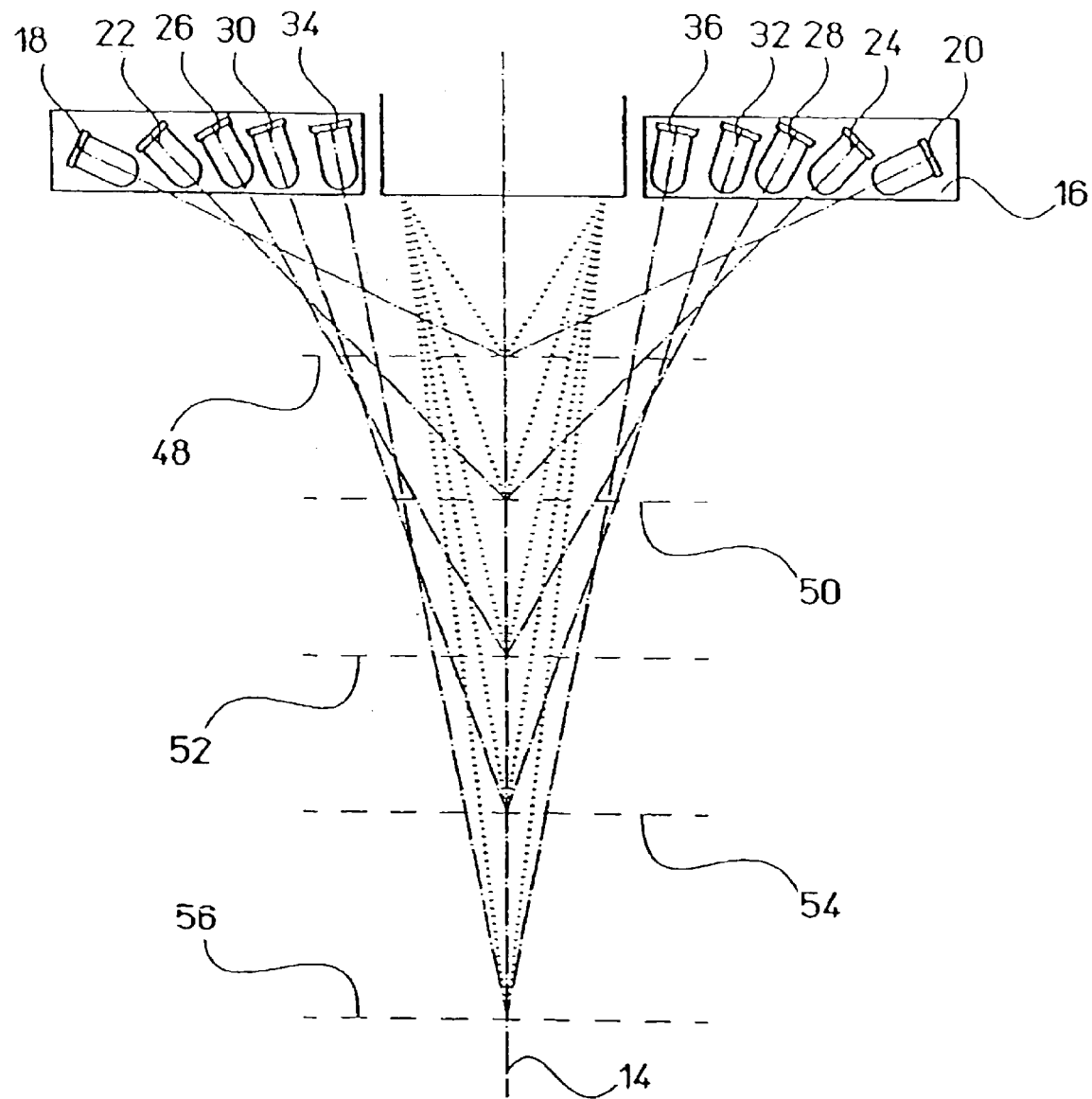
Figure 4:
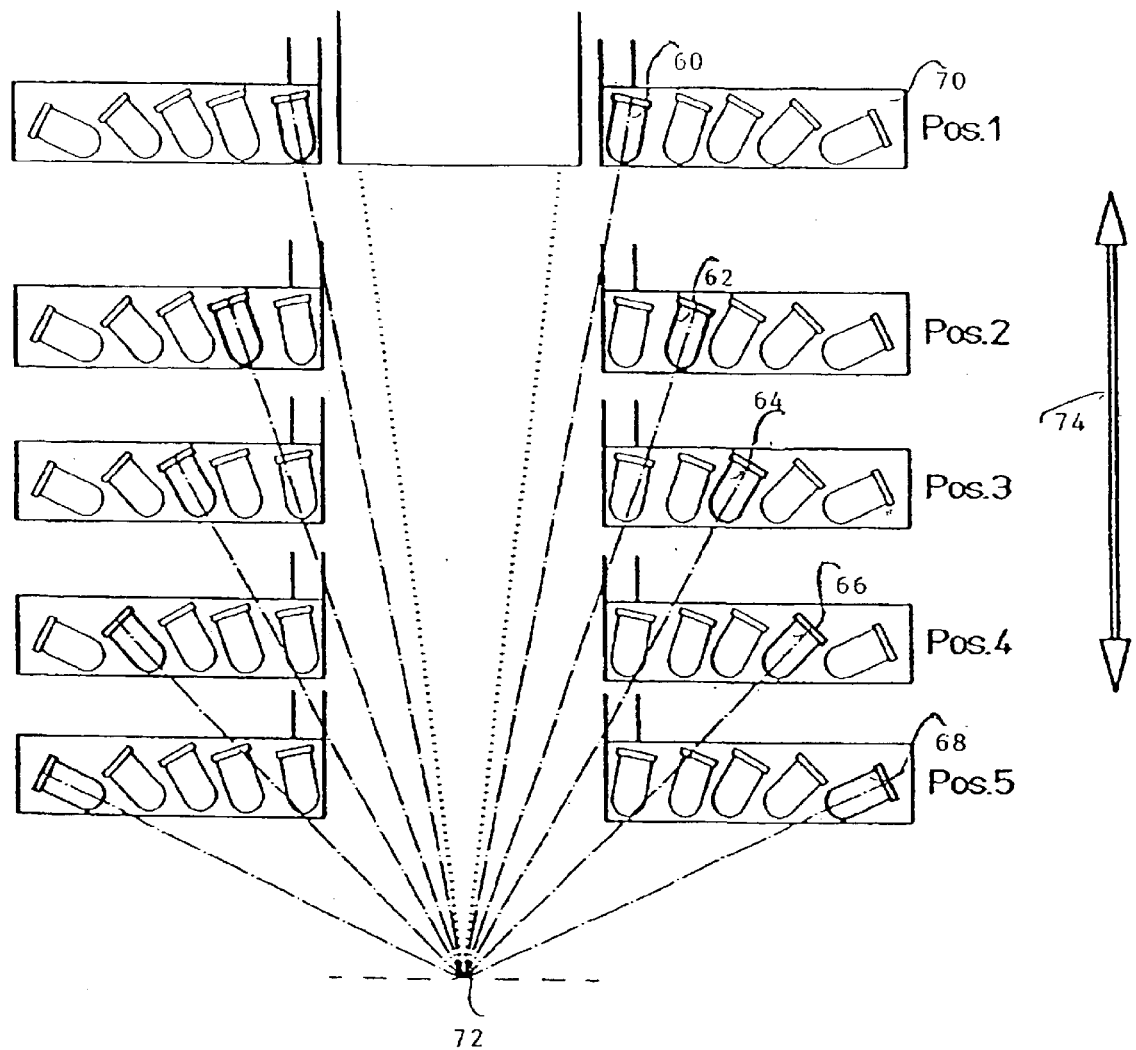

In the drawings,

FIG. 1 shows a schematic diagram of an illumination arrangement of an optical measuring device, FIG. 2 shows in sectional view a support for the illumination arrangement according to FIG. 1, FIG. 3 shows an alternative design of the illumination arrangement of FIG. 1, and FIG. 4 shows a schematic diagram of another design of an illumination arrangement.

In FIG. 1 is shown a section view and a cutout of an optical measuring device 10 with a housing 12 wherein the optic is accommodated, which is not shown, by means of which a radiation reflected by an object to be measured is imaged in a camera such as a CCD camera. The optic can be configured therein as zoom optic with a variable working distance, whose lens groups can be displaced independently from one other as disclosed in WO 99/53268. This optical measuring device 10 can be in particular part of a coordinate measuring system.

A support 16 is arranged concentrically with respect to the optical axis 14 of the optic, in which light sources, preferably in the form of LEDs, are arranged on circles running concentrically toward each other and radially offset with respect to each other. In the section view according to FIG. 1, the LEDs 18, 20 are arranged on a first circle, the LEDs 22, 24 are arranged on a second circle, the LEDs 26, 28 are arranged on a third circle, the LEDs 30, 32 are arranged on a fourth circle, and the LEDs 34, 36 are arranged on a fifth circle.

For this purpose, the support 16 has holders 38, 40, 42, 44, and 46 arranged on circles running concentrically toward each other for the LEDs 18, 20, 22, 24, 26, 28, 30, 32, 34, and 36, wherein these are arranged in such a way in the holders 38, 40, 42, 44, and 46 that different incidence angles result with respect to the optical axis 14. In this way, for example, the openings 38 are arranged on a circle on which the LEDs enclose an incidence angle α of approx. 70° with respect to the optical axis 14. By means of the openings 40 arranged on a circle, the LEDs are aligned at an angle β of, for example, 35° with respect to the optical axis 14. Concerning the openings 42 can be preset an angle γ of about 10°. The openings 44 lie again on a circle running concentrically with respect to the optical axis so as to intersect the LEDs at an incidence angle δ of, for example, 25°. Regarding the openings 46 can result, for example, an angle κ of 50°, while the disclosed values are mentioned purely as examples.

By means of the previously mentioned configuration of the support 16 it is achieved that the LEDs 18, 20, 22, 22, 24, 26, 28, 30, 32, 34, and 36 arranged on the circles running concentrically with respect to each other, which are represented by the holders 38, 40, 42, 44, and 46, intersect the optical axis 14 at different incidence angles in operational ranges, which are spaced with respect to each other, which are illuminated along the optical axis 14, and which are designated with the reference numerals 48, 50, 52, 54, and 56 in FIG. 1.

If, for example, a surface to be measured or an edge of an object is located within the operational range or within the working plane 52, then the light diodes 26, 28 are used, which illuminate optimally the working plane 52. If the working distance is changed, for example, by displacing the working distance within the plane 54, are then instead optimally active the light diodes 30, 32. Thus, it can be optimally measured over a large working distance range without requiring a mechanical displacement of the LEDs 18, 20, 22, 24, 26, 28, 30, 32, 34, and 36 or the support 16 with respect to the housing 12 that accommodates the optic.

The light sources are always aligned in such a way with respect to each other, that their beams meet within a predetermined working plane or illuminate a corresponding working plane. This again means that an area to be measured is always aligned with respect to the corresponding working plane.

Because in the illumination arrangement of the invention, the LEDs 18, 20, 22, 24, 26, 28, 30, 32, 34, are arranged on rings that concentrically enclose the optical axis 14 at defined angles in different sections of the optical axis 14, these are focused on another point of the optical axis 14 of the optic, that is, in the exemplary design of FIG. 1 they are focused on the intercept points between the optical axis 14 and the operational ranges or working planes 48, 50, 52, 54, and 56. While the focusing of the imaging system, that is, while focusing the optic on the corresponding intercept point, is produced a different beaming angle between the illumination angle and the surface of the object to be measured, so that an optimal illumination and consequently a high quality measurement is ensured.

As clarified in particular in FIG. 2, the height of the support 16 is relatively low notwithstanding the possibility that by means of the light diodes 18, 20, 22, 24, 26, 28, 30, 32, 34, and 36 can be obtained incidence angles with respect to the axis 14 within the range between 5° and 85° or more, and thus a correspondingly long operational range is made available, within which measurements can be carried out, so that the danger of collisions with an object to be measured are precluded.

For this purpose, it is especially provided that the surface 58 of the support 16 on the object side has a curvature radius R especially within a range between 30–90 mm, preferably 50–70 mm. As a consequence of the curvature radius R, the diameter of the support 16 itself is relatively small, whereas the inner diameter amounts to a maximum of 4 to 5 times the minimal working distance between the free lower side of the support 16 and an object to be measured. Thus, the distance between the light diodes 18, 20, 22, 24, 26, 28, 30, 32, 34, and 36 and the object to be measured is relatively small, so that again a high lighting is ensured.

While measuring, an object can be moved within the operational range in which an optimal illumination takes place. In dependence upon the light sources used until now can then be automatically adjusted the working distance of the measuring optic. There is in contrast the possibility of adjusting the optic without problem to a specific working distance, wherein the light sources, which are aligned with respect to this working distance, are switched on in dependence upon the working distance.

Furthermore, in the schematic diagram of FIG. 1 it can be seen that along the optical axis 14 can be imaged a bright field incident radiation by means of optical deflecting elements 58, 60.

The design in FIG. 3 differs from the one in FIG. 1 to the effect that the support does not have a hood or calotte-shaped geometry with respect to the arrangement of the light sources 18, 20, 22, 24, 26, 28, 30, 32, 34, and 36, but rather a rod or disk-shaped geometry, in which the light sources 18, 20, 22, 24, 26, 28, 30, 32, 34, and 36 are arranged within a plane, which preferably intersects vertically the optical axis 14.

If the support 16 is preferably basically a dial, which concentrically encloses the optic, then the light diodes 18, 22, 26, 30, and 34, on the one hand, and 20, 24, 28, 32, and 36, on the other hand, can be arranged alternatively within the cube or beam-shaped holders, which run parallel to each other.

If in the exemplary design of FIGS. 1 and 2 is provided a support, which has the sphere or calotte-shaped geometry with respect to the holders or arrangements of the light sources, then there is also the possibility according to FIG. 4 (as well as according to FIG. 3) of arranging the light sources 60, 62, 64, 66, and 68 at different incidence angles, which intersect the optical axis in areas, which are spaced with respect to each other. The light sources 60, 62, 64, 66, and 68 can be arranged in cubical or beam-shaped holders as the support 70, which in turn span a plane that runs especially vertical to the optical axis. A ring arrangement can also be selected, wherein the corresponding support can form a disk. The light sources 60, 63, 64, 66, and 68 can thus be arranged within a mutual plane, which runs parallel to the plane spanned by the support 70. To be able to illuminate the object 72 at different incidence angles, it is therefore necessary that the support 70 be displaced along the optical axis, that is, in accordance with the double arrow 74. In dependence upon the position of the support 70, light sources 60, 62, 64, 66, and 68 are activated at different incidence angles, whereby the object 72 is illuminated at different angles. This is clarified purely on principle in view of FIG. 4.

Regardless of this, the arrangement of FIG. 4 obeys the teaching of the invention insofar as, if the support 70 is fixedly arranged, the axes of the light sources 60, 62, 64, 66, and 68 intersect the optical axis in areas, which are spaced with respect to each other.

What is claimed is:

1. A measuring device, comprising:
   an illumination arrangement for illuminating an object to be measured comprising several light sources (18, 20, 22, 24, 26, 28, 30, 32, 34, 36, 60, 62, 64, 66, 68) going out from a support (16, 70) as well as an optic by means of which the object can be measured or imaged, where the light sources are arranged such in the support (16, 70), that incidence angles ($\alpha$, $\beta$, $\gamma$, $\delta$, $\kappa$) intersect the optical axis of the optic in different areas (48, 50, 52, 54, 56), wherein
   the optic (48, 50, 52, 54, 56) of the measuring device designed as coordinate measuring device is a zoom optic with variable working distance, that the incidence angles ($\alpha$, $\beta$, $\gamma$, $\delta$, $\kappa$) of the light sources (18, 20, 22, 24, 26, 28, 30, 32, 34, 36, 60, 62, 64, 66, 68) are arranged such that incidence angles of light sources intersect the optical axis (14) in each adjusted working distance regions of the optic, or that the optic has a constant working distance and the object (72) is illuminable by moving the support (70) along the optical axis (14) relatively to the optic under different angles of incident light.

2. The measuring device of claim 1, wherein the light sources (18, 20, 22, 24, 26, 28, 30, 32, 34, 36) are arranged on circles concentrically, which enclose the optical axis (14), while the light sources (18, 20, 22, 24, 26, 28, 30, 32, 34, 36) arranged on circles of different diameters intersect the optical axis (14) in divergent areas (48, 50, 52, 54, 56).

3. The measuring device of claim 1, wherein the light sources (18, 20, 22, 24, 26, 28, 30, 32, 34, 36), especially LEDs, are arranged on mutually successive circles, which are radially offset with respect to each other.

4. The measuring device of claim 1, wherein the support (16) encloses the optical axis (14) concentrically and in a collision-free way with respect to the object to be measured.

5. The measuring device of claim 1, wherein the support (16) for the light sources (18, 20, 22, 24, 26, 28, 30, 32, 34, 36) has a hood or calotte-shaped geometry with recesses such as bores (38, 40, 42, 44, 46), in which the light sources are arranged.

6. The measuring device of claim 1, wherein the support (70) accommodates the light sources (60, 62, 64, 66, 68) within a plane that intersects the optical axis preferably vertically.

7. The measuring device of claim 1, wherein the support (72) has a disk-shaped geometry such as a dial-shaped geometry.

8. The measuring device of claim 1, wherein the support has a cubic or block-shaped geometry.

9. The measuring device of claim 8, wherein the support consists of cubic or block-shaped sections running diametrically to the optical axis (14).

10. The measuring device of claim 1, wherein the support (70) is configured so as to be vertically displaceable.

11. The measuring device of claim 1, wherein the support (70) can be displaced manually or automatically parallel to the optical axis.

12. The measuring device of claim 1, wherein, if the working distance of the optic is constant, the object (72) can be illuminated by displacing the support (70) along the optical axis (14) at different light incidence angles.

13. The measuring device of claim 6, wherein the support (16) has on the side of the object a curvature radius R of 40 mm $\leq$ R $\leq$ 80 mm, in particular R of about 60 mm.

14. The measuring device of claim 1, wherein the radiation emitted by the light sources (18, 20, 22, 24, 26, 28, 30, 32, 34, 36) is deflected in such a way, that the object can be illuminated in the bright field incident light.

15. The measuring device of claim 1, wherein the light sources (18, 20, 22, 24, 26, 28, 30, 32, 34, 36) can be arranged so as to be displaceable within holders (38, 40, 42, 44, 46) of the support (16).

16. The measuring device of claim 1, wherein the light sources (18, 20, 22, 24, 26, 28, 30, 32, 34, 36) are arranged so as to be fixed within the support (16).

17. The measuring device of claim 1, wherein the light sources (18, 20, 22, 24, 26, 28, 30, 32, 34, 36) are aligned fiber bundles and/or fiber ring segments.

18. The measuring device of claim 1, wherein the light sources (18, 20, 22, 24, 26, 28, 30, 32, 34, 36) are radiations reflected by the mirrors.

19. The measuring device of claim 1, wherein a bright field incident radiation can be mirrored along the optical axis (14).

20. The measuring device of claim 1, wherein the light sources (18, 20, 22, 24, 26, 28, 30, 32, 34, 36) illuminate the object with divergent colors.

21. The measuring device of claim 1, wherein the light sources (18, 20, 22, 24, 26, 28, 30, 32, 34, 36) with the same incidence angles ($\alpha$, $\beta$, $\gamma$, $\delta$, $\kappa$) illuminate the object with the same color.

22. A process for illuminating an object with several light sources having different incidence angles with respect to an optical axis of an optic of a measuring device, with which the object is measured or imaged, wherein a zoom optic with variable working distance is used, and the incidence angle of the light sources is aligned in such a way with respect to the optical axis that different light sources intersect the optical axis in areas, which are spaced with respect to each other, wherein if the working distance of the optic is fixed, the support is displaced along the optical axis to illuminate the object at different incidence angles, wherein the light sources, whose incidence angle are aligned toward the working distance, illuminate the object in dependence upon the working distance of the optic.

23. The process of claim 22, wherein the working distance of the optic is adjusted in dependence upon the incidence angle of the light sources that illuminate the object.

* * * * *